United States Patent [19]

Goldstein et al.

[11] Patent Number: 5,211,872
[45] Date of Patent: May 18, 1993

[54] COMPOSITION FOR DETOXIFYING AMMONIA AND CHLORAMINE IN AQUATIC ENVIRONMENTS AND METHOD OF MAKING THE SAME

[75] Inventors: Joel M. Goldstein, Ambler; Vina Patel, Lansdale; Steven J. Wiley, Willow Grove, all of Pa.

[73] Assignee: Aquarium Pharmaceuticals, Inc., Chalfont, Pa.

[21] Appl. No.: 696,689

[22] Filed: May 7, 1991

Related U.S. Application Data

[62] Division of Ser. No. 557,252, Jul. 24, 1990, Pat. No. 5,082,573.

[51] Int. Cl.$^5$ .............................. C02F 5/12; C02F 5/10
[52] U.S. Cl. ..................................... 252/180; 252/181; 252/188.24; 210/754
[58] Field of Search .................... 252/180, 181, 188.21, 252/188.22, 188.23, 188.24; 210/749, 754

[56] References Cited

U.S. PATENT DOCUMENTS

| | | | |
|---|---|---|---|
| 2,315,734 | 4/1943 | Ralston et al. | 210/729 |
| 2,960,535 | 11/1960 | Bylsma | 564/275 |
| 3,079,340 | 2/1963 | Reamer | 252/188.24 |
| 3,080,315 | 3/1965 | Silvey | 210/699 |
| 3,960,649 | 6/1976 | Sullivan | 252/188.22 |
| 4,019,859 | 4/1977 | Lavin et al. | 422/16 |
| 4,082,683 | 4/1978 | Galesloot | 252/81 |
| 4,239,622 | 12/1980 | Ridgway | 424/615 |
| 4,313,827 | 2/1982 | Ratigan et al. | 210/136 |
| 4,317,813 | 3/1982 | Ridgway | 424/616 |
| 4,364,835 | 12/1982 | Cheh | 210/752 |
| 4,666,610 | 5/1987 | Kuhns | 210/754 |
| 4,676,912 | 6/1987 | Eckler | 210/729 |
| 4,786,434 | 11/1988 | Gunter | 252/181 |
| 5,049,297 | 9/1991 | Morris et al. | 252/80 |

OTHER PUBLICATIONS

International Search Report for International Application No. PCT/US91/05153.
DuPont Advertising Sheet No. H10436 entitled "Branch Out And Try Dytek ® A In Your Next Formulation".
DuPont Petrochemicals Technical Bulletin No. E-84603 (Apr. 1987) entitled "Dytek TM A As Exoxy Curing Agent".

Primary Examiner—Prince Willis, Jr.
Assistant Examiner—James Silbermann
Attorney, Agent, or Firm—Panitch Schwarze Jacobs & Nadel

[57] ABSTRACT

The present invention is a solution for detoxifying contaminants, such as ammonia, chlorine and chloramine, in aquatic systems. The solution includes a composition of an amine-based ammonia detoxifying compound, in an amount effective to detoxify substantially all of the ammonia, and a dechlorinator. An aqueous solution of the amine-based compound is acidified to adjust the pH to form a stable, non-toxic solution suitable for aquatic life. In addition, methods for preparing the detoxifying solution are disclosed.

12 Claims, No Drawings

COMPOSITION FOR DETOXIFYING AMMONIA AND CHLORAMINE IN AQUATIC ENVIRONMENTS AND METHOD OF MAKING THE SAME

This is a division of application Ser. No. 07/557,252, filed Jul. 24, 1990, now U.S. Pat. No. 5,082,573.

BACKGROUND OF THE INVENTION

1. Field of the Invention

The present invention relates to a method for detoxifying toxins or contaminants, particularly ammonia, chloramine and/or chlorine, from aquatic environments. In addition, the present invention is directed to a method for preparing a contaminant-detoxifying composition and the composition produced thereby.

2. Description of the Prior Art

Aquatic systems which support aquatic life generally comprise two types: the closed aquatic system and the open aquatic system. Further, aquatic systems can be divided into the naturally occurring aquatic systems and the artificial or man-made aquatic systems. Thus, naturally occurring closed aquatic systems include ponds and lakes, wherein a relatively fixed amount of water is present. Artificial closed systems include aquariums, such as household aquariums, man-made fish ponds for various uses, such as aquaculture, and other holding tanks used for storing, breeding and transporting fish and other aquatic life. Naturally occurring open systems include streams, while artificial open systems include flow-through systems, such as raceways used to raise trout. In such open systems, fresh (i.e., clean) water is continuously fed to the fish holding structure while a like quantity of water is continuously removed from the structure.

It is known in the biological arts that urea is excreted by animals as a result of normal animal metabolism and is rapidly converted into ammonia by biological action, primarily bacterial action. In aquatic systems, fish and other aquatic animal life excrete urea directly into the water, which is also rapidly converted into ammonia. Ammonia is also present in aquatic systems as a result of the decay of plant life, animal waste and uneaten food. If allowed to build up in an aquatic system, ammonia reaches toxic levels, causing sickness and death of aquatic life. Ammonia and other toxin buildup is not a particular problem in open aquatic systems, where fresh (i.e., clean) water continuously flushes away such toxins However, such open systems are costly and inefficient for aquaculture purposes, which is generally the breeding, raising, storing and transporting of fish and other aquatic life for food and other purposes. Naturally occurring and closed systems, on the other hand, have traditionally proven difficult to maintain due, in part, to ammonia buildup.

In addition, especially in smaller, man-made closed systems, such as aquariums for home use, water for such use is often derived from municipal or public utility sources, where the water has been chlorinated to disinfect and sanitize the water. Thus, an additional problem confronting the closed aquatic system user is the presence of chlorine. Moreover, chloramines may be present for the same reasons as chlorine and, further, as a result of the chemical reaction of chlorine with ammonia.

Ammonia, chlorine and chloramines are contaminants deadly to fish and other aquatic life, such as aquatic plants and marine algae, snails and other aquatic invertebrates. For this reason, it is desired to remove, neutralize or otherwise detoxify these contaminants to leave an aquatic system safe and non-toxic to aquatic life.

As used herein with respect to the present invention, "detoxify" means to reduce the toxicity of ammonia, chlorine or chloramines to a level at which plant and animal aquatic life are not killed or otherwise irreversibly harmed or irreversibly stressed, regardless of the chemical, biological or biochemical mechanism causing such results.

Conventional methods for removing ammonia in water include the use of zeolite in the form of loose chips, granules or powder through which the water must be passed. Conventional methods for detoxifying chlorine and chloramines in water include passing the water through activated carbon in the form of loose chips, granules or powder. Such methods, however, are generally inconvenient and inefficient because the zeolite or activated carbon chips, granules or powders are messy to handle and must be added to a filter container. Moreover, the amount of zeolite or activated carbon necessary to efficiently detoxify a given quantity of ammonia or chlorine from an aquatic system is difficult to measure.

Chlorine and chloramines have also been neutralized in aquatic systems by chemical means, such as by adding sodium thiosulfate, sodium bisulfite, sodium hyposulfite or sodium metabisulfite.

U.S. Pat. No. 4,666,610 discloses a method for the removal or neutralization of chloramines, chlorine and ammonia from aquatic systems by adding an alkali metal formaldehyde-bisulfite to the aquatic system. However, the method disclosed by this patent appears to merely neutralize the chloramines, chlorine and ammonia for a short time after the neutralizing compound is added. Tests have indicated that the compound disclosed by this prior patent is stable for only a few days, after which the ammonia appears to be released back into the system. In addition, the compound is acidic, which can lower the pH of the aquatic system and increases the risk of pH shock to any fish present. Moreover, the alkali metal formaldehydebisulfite is toxic to saltwater invertebrates, such as corals, and appears to be generally incompatible with commonly used aquatic disease remedies, such as malachite green, methylene blue and acriflavine.

In view of the deficiencies and inefficiencies of the prior art, it would be desirable to have a method for detoxifying ammonia in aquatic systems that is safe, non-toxic, easy to use and is capable of keeping the aquatic system substantially ammonia free for an extended period of time. Further, it would be desirable to have a method for detoxifying chlorine and chloramines in addition to ammonia that is safe, easy to use and non-toxic to aquatic life.

SUMMARY OF THE INVENTION

According to the present invention, a method for detoxifying ammonia in an ammonia-containing aquatic system comprises adding to the system an amine-based ammonia detoxifying solution in an amount effective to detoxify substantially all of the ammonia in the system, wherein the solution is non-toxic and has a pH suitable for aquatic life.

In addition, a method for detoxifying contaminants in a contaminated aquatic system, where the contaminants include ammonia, chlorine and chloramine, comprises adding to the contaminated system a contaminant detoxifying solution in an amount effective to detoxify substantially all of the contaminants, where the solution is a stable, non-toxic solution comprising an amine-based compound and a dechlorinator and has a pH suitable for aquatic life.

Further, the present invention is directed to a method of preparing a stable, non-toxic solution for detoxifying contaminants from aquatic systems comprising the steps of adding water to a reaction vessel, mixing an amine-based compound with the water, acidifying the amine-based compound to form a reaction mixture such that the solution has a pH suitable for aquatic life, and mixing a dechlorinator with the reaction mixture. The present invention is also directed to the novel composition prepared by this method.

DETAILED DESCRIPTION OF PREFERRED EMBODIMENTS

The present invention is directed to a method for detoxifying ammonia in an ammonia-containing aquatic system. Such aquatic systems include closed and opened aquatic systems which are naturally occurring or man-made including, but not limited to ponds, fish raceways, holding tanks and aquariums used for aquaculture, entertainment and hobby purposes. For reasons that will be apparent to one of ordinary skill in the art in view of this disclosure, it is presently intended that the methods of the present invention will be used in closed aquatic systems, wherein a known, relatively fixed amount of water is present. However, it will be readily appreciated by one of ordinary skill that other aquatic systems may be treated using the methods of the present invention.

In accordance with t.he present invention, ammonia is detoxified in an ammonia-containing aquatic system by adding to the system an amine-based ammonia detoxifying solution in an amount effective to detoxify substantially all of the ammonia in the system. The amount of the amine-based ammonia detoxifier necessary to detoxify substantially all of the ammonia will vary depending on the amount of ammonia to be detoxified in the aquatic system. The amine-based ammonia detoxifying solution comprises an amine-based ammonia detoxifying compound, sometimes referred to hereinafter as an "amine-based compound." For purposes of this disclosure, an amine-based ammonia detoxifying compound is a compound containing at least one functional amine group, and which, when the amine-based compound is acidified to a pH safe for aquatic life, is capable of neutralizing and/or reacting with ammonia present in an aquatic system to effectively detoxify the ammonia in the aquatic system. Preferably, the amine-based ammonia detoxifying compound is selected from the group consisting of alkanolamines and polyamines (i.e., alkylamines and arylamines having more than one and typically more than two functional amine groups).

According to the present invention, the amine-based compound is essentially non-toxic to aquatic life, including fish, aquatic invertebrates, aquatic plants and marine algae. The amine-based compound must be non-toxic to aquatic life when present in an aquatic system in an amount sufficient to detoxify the quantity of ammonia desired (discussed below). Moreover, it is preferred that the amine-based compound be non-toxic to aquatic life when present in amounts substantially greater than (e.g., three to twenty times) the amount required to detoxify ammonia present in an aquatic system to minimize any danger to aquatic life if the amine-based compound is accidentally added to the aquatic system in an amount exceeding the desired amount.

Specific examples of amine-based compounds suitable for use in accordance with the present invention include alkanolamines, such as monoethanolamine, diethanolamine and triethanolamine, and polyamines, such as 2-methyl pentamethylene diamine (MPMD), triethylene tetramine (TETA) and diethylene triamine (DETA). One skilled in the art will appreciate in view of the present disclosure, however, that other alkanolamines and polyamines may be used in accordance with the present invention. The presently preferred amine-based compound is MPMD.

We have found that the use of alkanolamines in newly established aquatic systems (i.e., systems not previously actively supporting aquatic life) to detoxify ammonia sometimes induces a uni-bacterial bloom, causing the water to become cloudy. While we do not wish to be bound by any particular theory for the cloudiness, we believe that, in newly established systems, certain bacteria capable of metabolizing alkanolamines flourish unhindered by competing bacteria typically found in established aquatic systems. It is preferred, therefore, to use polyamines to detoxify ammonia from newly established aquatic systems, if cloudiness is not a concern. Alkanolamines and/or polyamines may be used in established natural systems (ocean water, lakes, streams, etc.) or established artificial systems (aquariums, pounds, runs, etc.), without causing such bacterial blooms. In such established systems, we believe that a natural bacterial balance substantially eliminates a uni-bacterial bloom.

Preferably, the amine-based compound is present in an aqueous solution in an amount up to about the saturation point of the amine-based compound in the solution. The saturation point of a given amine-based compound may be readily determined by reference to published solubility tables or routine experimentation. The appropriate amount of amine-based compound to use in the detoxifying solution is determined by balancing economics and the effectiveness of detoxifying the ammonia in the aquatic system, and can be readily determined based on the disclosure herein without undue experimentation. It is preferred that the amine-based ammonia detoxifying compound be present in the solution in an amount of about 5% to about 50% by weight of the solution. Where MPMD is used as the amine-based compound in the present method, for example, it is presently preferred that the compound is present in the solution in an amount of about 26% by weight.

Because of the presence of the functional amine groups on the amine-based compound, it will be appreciated that the pH of the solution containing the amine-based compound will be relatively high or basic. It is well-known in the biological arts that aquatic animal and plant life generally require a pH of about 6.0 to about 9.0. More specifically, aquatic life in saltwater environments generally functions best at a pH of about 8.2 to about 8.5, whereas aquatic life in fresh water environments generally functions best at a pH of about 6.5 to about 8.0. It is presently preferred that the pH of the amine-based ammonia detoxifying solution is about 7.0 to about 7.2, although one of ordinary skill in the art may readily determine the desired pH depending on the optimum pH of the particular aquatic system to be treated using the method of present invention.

In accordance with the present invention, the amine-based ammonia detoxifying solution is added to an aquatic system in an amount effective to detoxify substantially all of the ammonia in the system. The biological results, such as those set forth in the following illustrative examples, demonstrate the effectiveness of the composition of the present invention in detoxifying ammonia in various aquatic systems.

The ammonia detoxifying solution is added in an amount sufficient to detoxify the known or estimated amount of ammonia in the aquatic system. Because the inventors believe that the capacity of each amine-based ammonia detoxifying compound varies with the functionality and quantity of the amine groups in the compound, to detoxify about 1.5 ppm ammonia from an aquatic system, the ammonia detoxifying solution is preferably added to the system in an amount of about 5 ml to about 100 ml per 10 gallons of water known or estimated to be in the aquatic system. For example, where the ammonia detoxifying compound comprises MPMD, the solution is added to the aquatic system in an amount of about 5 ml per 10 gallons of water to assure a sufficient amount, taking into account other potential reacting contaminants present in the system. One of ordinary skill in the art may readily determine the amount of amine-based ammonia detoxifying solution necessary to remove the ammonia present in an aquatic system in view of the present disclosure based on the amount of ammonia desired to be removed, and the ammonia detoxifying capacity of the particular amine-based compound used.

In many aquatic systems, especially in household aquariums and other domestic aquatic systems, the water used for the aquatic system is often derived from a municipal or public utility source where the water is chlorinated. Moreover, chlorine reacts with ammonia present in an aquatic system to form chloramines. For these reasons, it is often desirable to detoxify chlorine and/or chloramines in addition to ammonia.

We have found that the method and composition of present invention may be modified to detoxify chlorine and chloramines in addition to ammonia in aquatic systems. Thus, where it is desired to detoxify the contaminants ammonia, chlorine and/or chloramines from an aquatic system, the amine-based ammonia removing solution further comprises a dechlorinator. Conventional dechlorinators are disclosed by U.S. Pat. Nos. 4,666,610 and 4,786,434 which disclose the reduction of chlorine and chloramines by sodium thiosulfate, for example. These simple dechlorinators will completely neutralize or detoxify chlorine if added in a proper dosage to an aquatic system containing chlorine or chloramines by breaking the chlorine-ammonia bonds in chloramines and neutralizing or otherwise detoxify the chlorine.

The dechlorinator used according to the present invention may be any of a number of conventional dechlorinators. However, when used in aquatic systems, the dechlorinator must be non-toxic to aquatic life and should not react adversely with the amine-based ammonia detoxifying compound. For example, the reaction between the dechlorinator and the amine-based compound should not result in one or the other component precipitating out of solution, thereby creating a cloudy or unsightly aquatic system (especially home aquariums where water clarity is generally desired). In addition, the amine-based compound and dechlorinator should not react with one another to form a product that may be toxic to aquatic life.

Examples of dechlorinators suitable for use in accordance with the present invention include sodium thiosulfate, sodium bisulfite, sodium hyposulfite and sodium metabisulfite. However, we have found that certain dechlorinators do not react well with certain amine-based compounds. For example, sodium bisulfite and sodium metabisulfite do not mix well in solution with MPMD because the dechlorinator tends to precipitate out, resulting in a cloudy solution. Nevertheless, it is believed that if cloudiness is not a particular concern for a particular aquatic system, such amine-based compound/dechlorinator mixtures may be used to detoxify ammonia, chlorine and chloramines in such an aquatic system.

The dechlorinator may be present in the ammonia-chlorine-chloramine detoxifying solution (hereinafter referred to as a "contaminant detoxifying solution" to distinguish from the solution containing an amine-based ammonia detoxifying compound for detoxifying only ammonia) in an amount up to about the saturation point of the dechlorinator in the solution. The saturation point of a given dechlorinator may be readily determined by one of ordinary skill in the art by reference to published solubility tables or routine experimentation. The appropriate amount of dechlorinator to use in the contaminant detoxifying solution is determined by balancing economics and the effectiveness of detoxifying the chlorine and chloramines in the aquatic system, and can be readily determined based on the disclosure herein without undue experimentation. It is preferred that the dechlorinator be present in solution in an amount of about 5% to about 15% with about 10% by weight being presently preferred.

As with the amine-based ammonia detoxifying solution, the contaminant detoxifying solution is added to an aquatic system in an amount effective to detoxify substantially all of the ammonia, chlorine and/or chloramine contaminants in the system. The amount of chlorine and chloramine in an aquatic system may be determined using the N,N-diethyl-p-phenylenediamine (DPD) method and the amount of chlorine may also be determined using the Orthotoluidine test, both of which are described in *Standard Methods For the Examination of Water and Wastewater* published by the American Public Health Association (16th ed. 1985). It is preferred that the contaminant detoxifying solution is added to an aquatic system in an amount of about 5 ml to about 100 ml per 10 gallons of water known or estimated to be in the aquatic system. About 5 ml per 10 gallon of water is presently preferred.

The amine-based ammonia detoxifying solution, with or without a dechlorinator, is preferably added to an aquatic system by directly adding the solution to the water of the system and stirring, if desired. Where a dechlorinator is present in the solution and the amine-based compound is acidified with phosphoric acid ($H_3PO_4$), and where the aquatic system comprises saltwater, just before adding the contaminant detoxifying solution to the aquatic system, it is preferred to dilute the solution with fresh water to avoid precipitating certain salts (e.g., $CaPO_4$, $MgPO_4$) out of solution, which causes cloudiness. Preferably, diluting about 5 ml of the solution (a typical dosage) with about 4 oz. (about 118.3 ml) of fresh water generally avoids such precipitation.

The desired dosage may be repeated as frequently as needed, but it is believed that one dosage to a typical 10 gallon aquarium having a mixed variety of plant and animal life should detoxify chlorine and chloramines and keep the aquarium ammonia free for several weeks. For example, one presently preferred contaminant detoxifying solution comprises about 26% by weight MPMD, and about 10% by weight sodium thiosulfate with a pH of about 7.0, and can detoxify about 1.5 ppm ammonia, 4 ppm chlorine and about 1–1.5 ppm chloramine in a ten gallon tank per 5 ml dose.

Acidification of the amine-based compound is essential and critical for the ammonia detoxifying solution or the contaminant detoxifying solution to detoxify ammonia in an aquatic system. The extent of acidification is such that the solution has a pH suitable for aquatic life as set forth above.

The amine-based ammonia detoxifying solution according to the present invention may be prepared by adding the amine-based compound to an aqueous solution and acidifying the solution to the desired pH. Acidification of the solution may be performed using any organic or inorganic acid that is safe and non-toxic to aquatic life when used in the amount necessary to acidify the solution to the desired pH. The acid may be added to the amine-based compound in solution in monitored amounts using conventional methods and apparatus for acid addition or titration and pH testing until the desired pH is achieved.

The acid chosen should not react with the amine-based compound to form toxic or otherwise dangerous products. Suitable acids for acidifying the amine-based ammonia detoxifying compound and solution include HCl, $H_2SO_4$, $H_3BO_3$, $CH_3COOH$, $C_6H_5COOH$ and $H_3PO_4$. It is presently preferred to use hydrochloric acid (HCl) when the amine-based compound is a polyamine, such as MPMD, because it will not cause precipitation of salts in fresh water or saltwater and, when dilute acid is used, the quantity of heat produced during acidification is not excessive. When phosphoric acid is added to an alkanolamine solution a precipitate is formed. Accordingly, hydrochloric acid is presently preferred to acidify the solution when the amine-based compound comprises an alkanolamine.

Where a dechlorinator is to be added to the ammonia detoxifying solution and where HCl is the acidifying acid, the dechlorinator should be added to the solution after the amine-based compound is added and acidified to minimize precipitating the dechlorinator out of the solution. Thus, the amine-based compound is mixed with the water. HCl is then added, forming a reaction mixture. The acid is added in an amount to reduce the pH such that the pH of the solution is suitable and non-toxic to aquatic life. Then the dechlorinator is added.

Where an acid other than HCl is used, for example when $H_3PO_4$ is used to acidify the amine-based compound, the dechlorinator compound may be added as part of the contaminant detoxifying solution before or after the amine-based compound and acid are added to the water.

The theory by which the amine-based ammonia detoxifying solution acts to detoxify ammonia in the aquatic system is currently unknown. Regardless of the theory or mechanism of action or reaction, however, the present invention produces surprising and unexpected results; namely, the composition and method of using the composition of the present invention effectively and continuously detoxifies ammonia in an aquatic system for a period of several days to several weeks, as opposed to less effective, conventional prior art methods and compositions whereby ammonia is detoxified in the aquatic system for only a comparatively short period of time after addition of the prior art compositions to the system.

The present invention will now be illustrated in further detail by reference to the following specific, non-limiting examples.

EXAMPLE I

Effect of pH and Hardness on Ammonia and Chloramine Removal

Six tanks were set up containing de-ionized (DI) and/or tap water of varying hardnesses and pH, and each tank contained a known amount of ammonia or chloramine as indicated in Table 1 below.

TABLE 1

| Tank # | Water Used | Tank Contains | Relative Hardness | pH |
|---|---|---|---|---|
| 1 | DI Water | 2 ppm ammonia | Soft | 6.8 |
| 2 | DI Water | 1 ppm chloramine | Soft | 6.8 |
| 3 | 50% DI/ 50% Tap | 2 ppm ammonia | Moderately Hard | 7.6 |
| 4 | 50% DI/ 50% Tap | 1 ppm chloramine | Moderately Hard | 7.6 |
| 5 | Tap Water | 2 ppm ammonia | Hard | 8.1 |
| 6 | Tap Water | 1 ppm chloramine | Hard | 8.1 |

Each of the tanks was treated with a contaminant detoxifying solution according to the present invention containing about 26.56% by weight of MPMD, about 10.62% by weight sodium thiosulfate and about 46.87% by weight of a 30% solution of phosphoric acid, the balance of the aqueous contaminant detoxifying solution being water. The pH of the solution was about 7.0. An amount equivalent to 1 teaspoon (about 5 ml) per 10 gallons water of the solution was added to each tank. A mixed variety of aquarium fish were then added to each of the tanks. After 28 days, no fish deaths were observed.

These results indicate that a pH varying from about 6.8 to about 8.1 and varying hardness of the tank water have no effect on the activity of the contaminant detoxifying solution. These results further indicate that the contaminant detoxifying solution is non-toxic to a mixed variety of fish and that ammonia released into the tank water by the fish during the 28 days was also detoxified by the contaminant detoxifying solution.

EXAMPLE II

Effect on Oxygen ($O_2$) Level

Two water tanks were set up. One contained established fresh water (water previously supporting a variety of aquatic life) and the other contained newly established fresh water comprising 50% de-ionized water and 50% tap water. The dissolved oxygen content level of the water was recorded using a digital YSI TM oxygen meter which indicated a level of 6.5 ppm $O_2$ in the established tank and 6.8 ppm $O_2$ in the newly established tank. The contaminant detoxifying solution as prepared in Example I was added to each of the tanks in an amount equivalent to 1 teaspoon (about 5 ml) per 10 gallons of water. After addition of the solution to the tanks, a second oxygen level reading was taken, which indicated a level of 6.5 ppm $O_2$ in the established tank and a level of 6.8 ppm $O_2$ in the newly established tank. These results indicate that the contaminant detoxifying solution has no effect on the oxygen level of an aquatic system which is critical to sustaining aquatic life.

EXAMPLE III

Reaction with Dye-Containing Medications

Three 10 gallon tanks with proper water chemistry for household aquarium use were set up, each containing one normal dose of the following medications available from Aquarium Pharmaceuticals, Inc.: (1) Super Ick Cure TM medication, which contains malachite green; (2) Fungus Cure TM medication, which contains acriflavine; and (3) 76 ml of a 1000 ppm methylene blue solution. The contaminant detoxifying solution as prepared in Example I was added to each of the three tanks in an amount equivalent to 1 teaspoon (about 5 ml) per 10 gallons of water.

In the first tank containing Super Ick Cure TM medication, the green color persisted as before addition of the contaminant detoxifying solution, indicating that no reaction had occurred between malachite green and the contaminant detoxifying solution. The Super Ick Cure TM medication exhibited its intended effect with full efficiency.

In the second tank containing Fungus Cure TM medication, the yellow fluorescent color persisted as before addition of the contaminant detoxifying solution, indicating that there was no reaction between acriflavine and the contaminant detoxifying solution. The Fungus Cure TM medication appeared to work with full efficiency, indicating no reaction between the medication and the contaminant detoxifying solution.

In the third tank containing methylene blue, the blue color persisted, indicating that there was no reaction between the contaminant detoxifying solution and the methylene blue appeared t work with full efficiency.

EXAMPLE IV

Reaction with Stress-Coat ® Treatment

One normal dose of Stress-Coat ® slime coat treatment available from Aquarium Pharmaceuticals, Inc. was added to a newly established water tank. The contaminant detoxifying solution as prepared in Example I was added in an amount equivalent to 1 teaspoon (about 5 ml) per 10 gallons water. A mixed variety of observed reaction between the Stress-Coat ® treatment and the contaminant detoxifying solution. The fish appeared fine and healthy with no toxic effects observed and no stress (generally indicated by rapid pumping/gasping of gills; fading color; loss of appetite; sluggishness, darting or erratic swimming behavior; clamped fins; hanging at surface; and/or sitting on bottom) was observed. These results indicated that the contaminant detoxifying solution is compatible with Stress-Coat ® treatment with no adverse effect on the treatment or the fish.

EXAMPLE V

Contaminant Detoxifying Solution Effect on Scaleless Fish

A water tank with proper water chemistry was set up to support scaleless fish, including clown loaches (*Botia macracantha*), channel catfish (*Ictalurus punctatus*), elephant nose fish (*Gnathonemus petersii*) and puffers (*Tetradon schoutedeni*). The contaminant detoxifying solution as prepared in Example I was added to the tank in an amount equivalent to 1 teaspoon (about 5 ml) per 10 gallons of water. After 28 days, no toxic or harmful effect was observed on the scaleless fish. The fish appeared healthy, without damage and without stress.

EXAMPLE VI

Effect on Plants

Two tanks were established with the proper chemistry to support fresh water plants and marine (saltwater) plants as follows: fresh water plants—*Echinodorus osiris, Liliaeopsis novaezelandiea, Combomba caroliniana* and *Cryptocoryne* sp.; marine plants—*Calerpa racemosa, C. prolifera, Dictyota dichotoma, Ulva lactuca* and *Padina vickersiae*. The contaminant detoxifying solution as prepared in Example I was added to each of the tanks in an amount equivalent to 1 teaspoon (about 5 ml) per 10 gallons of water. After 56 days, no harmful effects or plant deaths were observed. The plants appeared to continue normal growth.

EXAMPLE VII

Effect on Established Reef Tank

An established reef tank (salt water) was used for this example. The established reef tank contained the following aquatic life: Plerogira sp.; Goniopora sp.; Zoanthid sp.; Long Spine Urchin (*Diadema antillarum*); Flower Coral (*Mussa angulosa*); Orange Sea Grape (*Molgula citrina*); Curly Terebellid Worm (*Polycirrus eximins*); Feather Duster (*Potamilla reniformis*); Star Tube Worm (*Pomatostegus stellatus*); Pink-Tipped Anemone (*Condulactis gigantea*); Four-Sided Sea Cucumber (*Stichopus badionotus*); Spiny Brittle Star (*Ophioderma appressum*); Grabbams Cleaning Shrimp (*Hippolysmata grabhami*); Banded Coral Shrimp (*Stenopus hispidus*); Flame Scallop (*Lima scabra*); and Slime Sponge (*Halisarca dujardini*). The contaminant detoxifying solution as prepared in Example I was added to the tank in an amount equivalent to 1 teaspoon (about 5 ml) per 10 gallons of water. After the addition of the contaminant detoxifying solution, some coral species retracted but recovered in about 10 to 15 minutes. After 90 days, no detrimental effects were observed. Aquatic life activity appeared normal.

EXAMPLE VIII

Effect on New Reef Tank

The following specimens of aquatic life were placed in each of two 10 gallon tanks with artificial seawater, by standard techniques using H&W TM sea salt at a concentration of 35 parts of salinity per thousand parts of water: two fish species, namely three specimens of *Chromis viridis* (Green damsel) and one specimen of *Dascyllus melanurus* (Black-tailed Humbug); and one colony of *Zoanthis* sp. (Button polyp).

10 ppm of ammonia (as $NH_4Cl$) were put in each tank. One tank was left as a control tank, while in the second ("experimental") tank, 34 ml of the contaminant detoxifying solution of Example I were added (according to the dosage: 5 ml of the contaminant detoxifying solution per 10 gal. to detoxify 1.5 ppm of ammonia). The temperature remained 77° F. during the experiment.

Over a period of 68 hours, all of the fish in the control tank were dead. The Zoanthid colony in the control tank was completely constricted and excreted some slime, which is an obvious consequence of the high concentration of the ammonia. In contrast, all fish in the second ("experimental") tank were alive, and the Zoanthid colony, while being slightly stressed (apparently due to the high concentration of chemicals in the water), was showing fully open individual polyps and no slime at all.

Because the selected species of fish are very hardy and comparatively tolerant to high ammonia concentration, the death of all fish in the control tank shows the dramatic difference versus the "experimental" tank. Thus, this experiment demonstrates the effectiveness of the contaminant detoxifying solution in detoxifying even an extraordinarily high experimental concentration of ammonia in a saltwater aquatic system.

EXAMPLE IX

Effect of Large Dose on Invertebrates in Reef Tank

Two ten gallon tanks were filled with saltwater from a central filtration system used with many reef tanks. An airstone was added to each aquarium to supply aeration. Each tank contained a variety of marine invertebrates listed in Table 2. The normal dose of the contaminant detoxifying solution of Example I is 5.0 ml/10 gallons of aquarium water. 50.0 ml/10 gallons, a 10× dose, of the contaminant detoxifying solution were added to the test tanks. The organisms were observed for 24 hours.

TABLE 2

| Invertebrate List | |
|---|---|
| Zooauthus sociatus | Polyp Rock |
| Plerogyra sinuosa | Bubble Coral |
| Euphyllia divisa | Coral |
| Spirobranchus gigantus | Christmas Tree Worms |
| Diodema leucolena | Urchin |
| Actinodiacus | Soft Coral |
| Cucumaria tricolor | Sea cucumber |

After 24 hours all organisms appeared normal. No unusual symptoms were observed, contrary to what would have been expected. A 10× dose would be expected to cause some type of negative response such as discoloration, shrinking body size, or death. The contaminant detoxifying solution was demonstrated to be non-toxic in a 10× dose, even after 24 hours. All organisms remained healthy after being replaced in their original holding aquariums.

EXAMPLE X

Effect of Increased Dose on an Established Reef Tank

An established marine (saltwater) aquarium contained a variety of marine organisms as listed in Table 3. 2× dose (10 ml/10 gallons) of the contaminant detoxifying solution of Example I was added to the aquarium. The 2× dosage was added in two steps. A first step involved adding the contaminant detoxifying solution at normal dosage (5 ml/10 gallons). Ten minutes later, another normal dosage was added in the second step.

TABLE 3

| Marine Test Organisms | |
|---|---|
| Plants | Invertebrates |
| Caulerpa racemosa | Zooanthus sociatus - polyps |
| Caulerpa prolifera | Catalaphyllia leucolena - coral |
| Neomaris annulata | Isarus duchassaingi - polyps |
| | Stoichactis - anemone |
| | Diodora inaegualis - limpet |
| Fish | Hipposlymat grabhaini - cleaner shrimp |
| Zebrasoma flauescens | yellow tang |

TABLE 3-continued

| Marine Test Organisms | |
|---|---|
| Paracanthus hepatus | blue tang |

All organisms appeared normal after the first step addition of the normal dose of the contaminant detoxifying solution. When the second dose was added in the second step, the organisms gave no response to the additional dose. All organisms remained normal for the next two months. The aquarium was then dismantled.

EXAMPLE XI

Fresh Water Toxicity Testing

Two ten gallon tanks were filled with fresh water from a central filtration system feeding several aquariums. Three Tiger Barbs Capoeta sp. were added to each tank. An airstone supplied aeration in each tank. Ammonia (10. 0 ppm) as ammonium chloride ($NH_4Cl$) was added to both tanks. 33 ml of the contaminant detoxifying solution of Example I were added to one tank. The other tank served as the control. Observations were made after the next three days.

After 24 hours, the fish in the control tank showed stress symptoms: the gills of the Tiger Barbs were bright red, and the fish in the control tank swam erratically. The fish in the treatment tank appeared normal. After 48 hours, one control fish was dead and the other two were swimming at the top of the aquarium, characteristic of improper respiration. The fish in the treatment tank appeared normal. At 72 hours, the symptoms remained the same as after 48 hours for both tanks.

This test demonstrated that the fish in the control tank clearly suffered from ammonia stress, while the fish in the treatment tank were non-stressed. Based on the observations, the contaminant detoxifying solution detoxified the ammonia in the treatment tank.

EXAMPLE XII

Efficiency of Diethanolamine

One liter of de-ionized water containing about 5 ppm ammonia was added to a beaker. Diethanolamine (100% solution), acidified with concentrated HCl to a pH of about 7, was added dropwise to the beaker. In-between each added drop of diethanolamine, the water was tested using the Dry Tab TM Test Kit (Salicylate Hypochlorite method) until no ammonia was detected in the water. This procedure indicated that 0.5 ml of acidified diethanolamine was required to detoxify the ammonia.

The present invention may be embodied in other specific forms without departing from the spirit or essential attributes thereof and, accordingly, reference should be made to the appended claims, rather than the specification as indicating the scope of the invention.

We claim:

1. A method of preparing a stable, non-toxic solution for detoxifying contaminants in aquatic systems, the contaminants selected from the group consisting of ammonia, chlorine and chloramine, comprising the steps of:
    (a) adding water to a reaction vessel;
    (b) mixing a polyamine compound with the water, wherein the polyamine compound is present in an amount up to about the saturation point of the polyamine compound in the solution;

(c) acidifying the polyamine compound to form a reaction mixture such that the solution has a pH suitable for aquatic life; and (d) mixing a dechlorinator with the reaction mixture, wherein the dechlorinator is present in an amount up to about the saturation point of the dechlorinator in the solution.

2. The method according to claim 1, wherein the dechlorinator is selected from the group consisting of sodium thiosulfate, sodium bisulfite, sodium hyposulfite and sodium metabisulfite.

3. The method according to claim 2, wherein the dechlorinator is sodium thiosulfate and the polyamine compound is 2-methyl pentamethylene diamine.

4. The method according to claim 1, wherein the acidifying step (c) comprises adding a non-toxic organic or inorganic acid to the mixture.

5. The method according to claim 4, wherein the acid is selected from the group consisting of HCl, $H_2SO_4$, $H_3BO_3$, $CH_3COOH$, $C_6H_5COOH$ and $H_3PO_4$.

6. The method according to claim 4, comprising adding 2-methyl pentamethylene diamine in an amount comprising about 26% by weight of the solution then adding HCl to the reaction mixture in an amount sufficient to reduce the pH of the solution to about 7.2, and then adding sodium thiosulfate in an amount of about 10% by weight of the solution.

7. The method according to calim 1, wherein the polyamine compound is present in an amount of about 5% to about 50% by weight and wherein the dechlorinator is present in an amount of about 5% to about 15% by weight.

8. The contaminant detoxifying solution prepared by the method of claim 1.

9. The contaminant detoxifying solution according to claim 8, wherein the dechlorinator is selected from the group consisting of sodium thiosulfate, sodium bisulfite, sodium hyposulfite and sodium metabisulfite.

10. The contaminant detoxifying solution according to claim 9, wherein the dechlorinator is sodium thiosulfate and the polyamine compound is 2-methyl pentamethylene diamine.

11. The contaminant detoxifying solution according to claim 3, comprising 2-methyl pentamethylene diamine in an amount of about 26% by weight and sodium thiosulfate in an amount of about 10% by weight, wherein the solution has a pH of about 7.2.

12. The contaminant detoxifying solution according to claim 31, wherein the polyamine compound is present in an amount of about 5% to about 50% by weight and wherein the dechlorinator is present in an amount of about 5% to about 15% by weight.

* * * * *